UNITED STATES PATENT OFFICE.

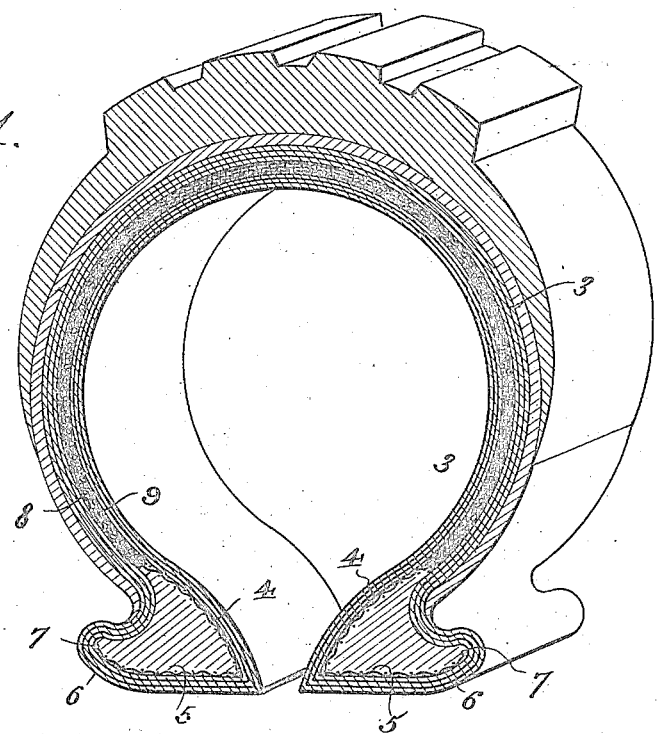
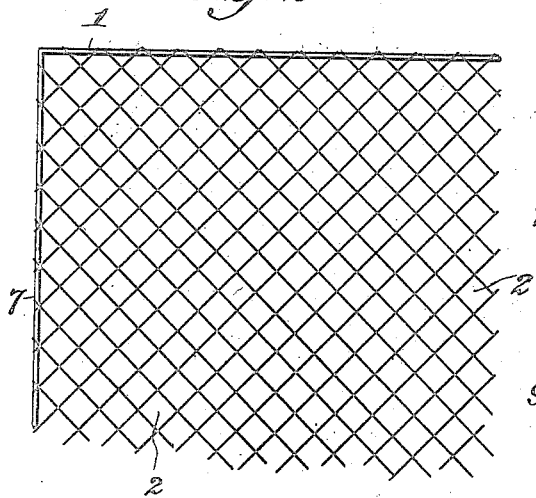
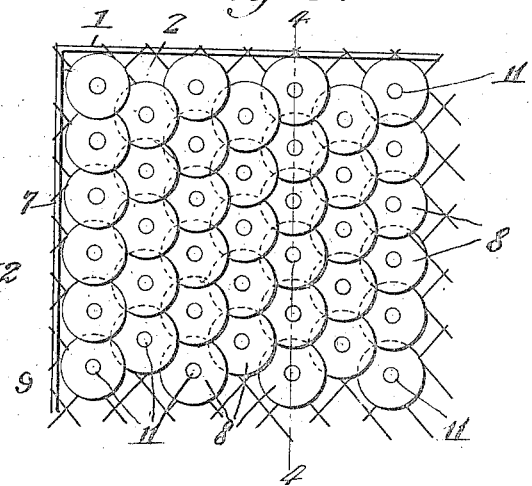
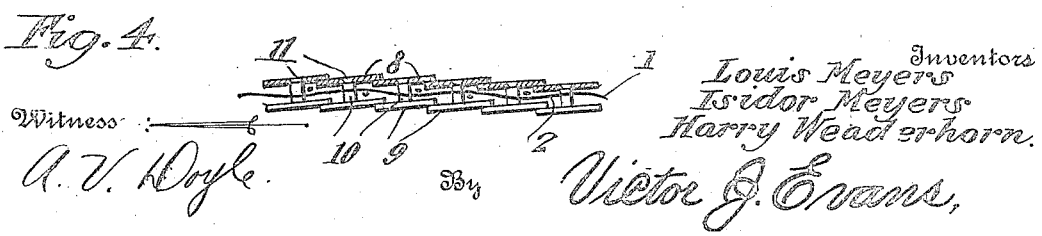

LOUIS MEYERS, ISIDOR MEYERS, AND HARRY WEADERHORN, OF NEW YORK, N. Y.

TIRE-PROTECTOR.

1,247,560.  Specification of Letters Patent.  Patented Nov. 20, 1917.

Application filed August 2, 1916. Serial No. 112,815.

*To all whom it may concern:*

Be it known that we, LOUIS MEYERS, ISIDOR MEYERS, and HARRY WEADERHORN, citizens of the United States, residing at 139 East 76th St., New York, in the county of New York and State of New York, have invented new and useful Improvements in Tire-Protectors, of which the following is a specification.

This invention relates to tire protectors and particularly to protectors for pneumatic automobile tires.

The principal object of the invention resides in the provision of means interposed between the fabric layers of the body of the shoe and designed whereby to lend to the resiliency of the tire and to preserve and guard the shoe against blow outs incident to any over crowding of the inner tube with air.

A further object of the invention resides in the provision of a protector which will include a flexible armor made of a series of sets of thin metal disks, the disks of each set being arranged in overlapping relation and substantially superposed relatively of the disks of the next set and we have so constructed the disks of the described mating sets and connected the same with each other whereby to prevent any portions of the tire from being unduly injured.

We further aim to provide a flexible armor consisting of flexible disks and a relatively yieldable frame supporting all of said disks and constructed so as to permit the same to creep circumferentially of the tire and only for such distance as may be necessary to compensate for all ordinary actions of the tire, such as at a time when it may be subjected to some sudden shocks or jars or the tire inflated under different pressures respectively, and we wish that it be further observed that said frame also serves as a backing or brace for the disks to prevent any detrimental flexing of the same when they are brought in contact with foreign objects such as nails or the like which may penetrate the tread section of the shoe.

In the drawings forming a part of this specification and in which like reference numerals indicate similar parts throughout the several views:—

Figure 1 is a vertical transverse section through the tire showing the application of the protector thereto.

Fig. 2 is a plan of a portion of the resilient frame.

Fig. 3 is a similar view showing the flexible armor surface applied thereto.

Fig. 4 is a section on the line 4—4 of Fig. 3.

In carrying the invention into practice, use is made of a resilient frame 1, constructed of mesh material, which consists of wire strands interwoven or otherwise suitably secured together whereby the meshes 2 between the strands are substantially of diamond shape. This frame is interposed between plies of cloth and the same is inserted or built up between the layers of textile material or canvas 3, usually employed in an ordinary tire structure. The mentioned frame 1 is of a size whereby it will extend entirely around the tire and it is terminally provided with sides 4—4 which are bent outwardly at 5 and arranged in the attaching flanges 6 of the tire whereby to reinforce said flanges. The marginal edges of the portions 5 are connected with continuous reinforcing wires or rings 7.

This frame is designed to increase the general buoyancy of the tire and in practice, it is found that aside from lending to the resiliency of the tire, it also serves to strengthen the tire and to minimize the possibility of blow-outs which so commonly occur in automobile tires. The tire body is uniformly reinforced by the resilient metallic frame incident to the fact that it conforms exactly with the transverse configuration of the tire as will be observed in Fig. 1 of the drawings.

As a means of protecting the tire against being punctured by foreign objects which may penetrate the walls of the shoe, we provide a flexible armor which consists of a set of disks 8 and a similar set of disks 9. The frame 10 is sandwiched between said disks and is illustrated in Fig. 3, the disks of the respective sets are arranged in relatively overlapping relation. They are disposed in close contact with the frame 1 and in view thereof, said disks are reinforced by the cross strands of wire which constitute said frame. The outer disks 8 are formed of steel, while the inner disks are preferably constructed of copper and they are provided with shanks 10 which are riveted at 11 to the disks 8. The shanks pass through the diamond shape meshes between the wire strands of the frame 1 and incident to the peculiar shape of said meshes it follows that the disks are free for slight lateral and circumferential movements. In fact, said disks are free for all movements which may be necessary in order that the armor structure will properly accommodate itself to various changes in the condition of the tire shoe. When the tire is made to undergo severe uses and it is compelled to receive sudden jars, the metallic frame 1 will yieldingly take up said shocks and jars.

The disks 8 and 9, through the fact that they are connected by the shanks 10 are held against circumferential creeping beyond a certain extent around the shoe.

What is claimed as new is:—

The combination with a resilient tire, of a protecting and strengthening member embedded therein, comprising in combination a resilient frame extending entirely around the tire and conforming transversely with the cross sectional shape of the tire, spaced diagonally arranged interwoven strands of wire carried by said frame and defining rectangular openings, overlapping metal disks arranged upon the opposite sides of the diagonally arranged wire strands and shanks connecting the opposite disks, said shanks being of lesser diameter than the rectangular openings, for permitting a limited relative movement of the overlapping disks.

In testimony whereof we affix our signatures.

LOUIS MEYERS.
ISIDOR MEYERS.
HARRY WEADERHORN.